United States Patent
Binek et al.

(10) Patent No.: US 11,441,451 B2
(45) Date of Patent: Sep. 13, 2022

(54) TURBINE ENGINE COMPONENT WITH INTEGRATED WAVEGUIDE

(71) Applicant: Raytheon Technologies Corporation, Farmington, CT (US)

(72) Inventors: Lawrence A. Binek, Glastonbury, CT (US); Sean R. Jackson, Palm City, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/034,854

(22) Filed: Sep. 28, 2020

(65) Prior Publication Data

US 2022/0099001 A1    Mar. 31, 2022

(51) Int. Cl.
  *F01D 25/24* (2006.01)
  *G08C 19/00* (2006.01)

(52) U.S. Cl.
  CPC .......... *F01D 25/24* (2013.01); *F05D 2220/32* (2013.01); *F05D 2240/14* (2013.01); *G08C 19/00* (2013.01)

(58) Field of Classification Search
  CPC ................................ F01D 25/24; H01P 1/027
  See application file for complete search history.

(56) References Cited

U.S. PATENT DOCUMENTS

| 9,784,827 B2 | 10/2017 | Shepard |
| 10,096,880 B2 | 10/2018 | Zhu |
| 10,307,138 B2 | 6/2019 | Heims |
| 10,411,756 B2* | 9/2019 | Snyder ...................... H04B 3/52 |
| 10,573,949 B2 | 2/2020 | Fluitt |
| 10,751,988 B1 | 8/2020 | Snyder |
| 2010/0129202 A1 | 5/2010 | Garner |
| 2016/0028141 A1 | 1/2016 | Shimizu |
| 2018/0289359 A1 | 10/2018 | Heims |
| 2018/0294838 A1 | 10/2018 | Snyder |
| 2018/0366800 A1 | 12/2018 | Sysouphat |
| 2020/0194860 A1* | 6/2020 | Hollenbeck ............. B22F 10/10 |
| 2020/0274215 A1 | 8/2020 | Morris |

FOREIGN PATENT DOCUMENTS

| CN | 109119736 A | 1/2019 |
| EP | 3291363 B1 | 5/2021 |

OTHER PUBLICATIONS

EP search report for EP21199597.2 dated Jan. 13, 2022.

* cited by examiner

*Primary Examiner* — Ninh H. Nguyen
*Assistant Examiner* — John S Hunter, Jr.
(74) *Attorney, Agent, or Firm* — Getz Balich LLC

(57) ABSTRACT

An assembly is provided for a turbine engine. This turbine engine assembly includes a turbine engine case, a first transceiver and a second transceiver. The turbine engine case includes a case wall and a waveguide. The waveguide is formed integral with the case wall. The waveguide includes a waveguide channel. The second transceiver is configured to be in signal communication with the first transceiver through the waveguide channel.

20 Claims, 7 Drawing Sheets

TURBINE ENGINE COMPONENT WITH INTEGRATED WAVEGUIDE

BACKGROUND OF THE DISCLOSURE

1. Technical Field

This disclosure relates generally to a gas turbine engine and, more particularly, to signal communication between devices for the gas turbine engine.

2. Background Information

A gas turbine engine may include various electronic components configured in signal communication with one another through a wiring harness. A typical wiring harness includes a multitude of wires for providing signal paths between the electronic components. One or more of these wires are connected to a respective electronic component through a connector. However, if one or more connectors are not fully seated or mated with the wrong components, the turbine engine and its electronic components may not properly function. Furthermore, a typical wiring harness takes up valuable peripheral space about the gas turbine engine. There is a need in the art therefore for an improved signal communication system which may reduce or obviate the need for wire connectors and/or free up space about the gas turbine engine.

SUMMARY OF THE DISCLOSURE

According to an aspect of the present disclosure, an assembly is provided for a turbine engine. This turbine engine assembly includes a turbine engine case, a first transceiver and a second transceiver. The turbine engine case includes a case wall and a waveguide. The waveguide is formed integral with the case wall. The waveguide includes a waveguide channel. The second transceiver is configured to be in signal communication with the first transceiver through the waveguide channel.

According to another aspect of the present disclosure, another assembly is provided for a turbine engine. This turbine engine assembly includes a turbine engine case, a waveguide channel, a first transceiver and a second transceiver. The waveguide channel is integrated with the turbine engine case. The second transceiver is configured to be in signal communication with the first transceiver through the waveguide channel.

According to still another aspect of the present disclosure, another assembly is provided for a turbine engine. This turbine engine assembly includes a turbine engine component, a first transceiver and a second transceiver. The turbine engine component includes a wall and a waveguide. The waveguide is adjacent and extends along the wall. At least the wall and the waveguide are configured together as a monolithic body. The second transceiver is configured to be in signal communication with the first transceiver through the waveguide.

The turbine engine component may be configured as or otherwise include a turbine engine case. The wall may be configured as or otherwise include a case wall of the turbine engine case.

The waveguide channel may be embedded within the turbine engine case.

The turbine engine case may include a case wall and a waveguide. The waveguide may be configured with the case wall as a monolithic body. The waveguide may include the waveguide channel.

The first transceiver may be attached to the turbine engine case at a first portal of the waveguide channel.

The second transceiver may be attached to the turbine engine case at a second portal of the waveguide channel.

The turbine engine assembly may also include a third transceiver configured to be in signal communication with at least the first transceiver through the waveguide channel.

The waveguide channel may include a plurality of channel segments interconnected at a junction. The channel segments may include a first channel segment, a second channel segment and a third channel segment. The first channel segment may extend from the junction towards the first transceiver. The second channel segment may extend from the junction towards the second transceiver. The third channel segment may extend from the junction towards the third transceiver.

The junction may be configured as a T-junction.

The T-junction may be a magic tee junction.

The waveguide may include a first projection that projects into the waveguide channel.

The waveguide may also include a second projection that projects into the waveguide channel. The first projection and the second projection may be arranged on opposing sides of the waveguide channel.

At least a portion of the waveguide channel may have a lobed cross-sectional geometry.

At least a portion of the waveguide channel may have an H-shaped cross-sectional geometry.

The turbine engine assembly may also include a controller in signal communication with the waveguide channel through the first transceiver.

The turbine engine assembly may also include a sensor in signal communication with the waveguide channel through the second transceiver.

The turbine engine assembly may also include a combustor section at least partially housed within the turbine engine case.

The turbine engine assembly may also include a turbine section at least partially housed within the turbine engine case.

The first transceiver may be configured to transmit a radio frequency (RF) signal into and to receive a radio frequency (RF) signal from the waveguide.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
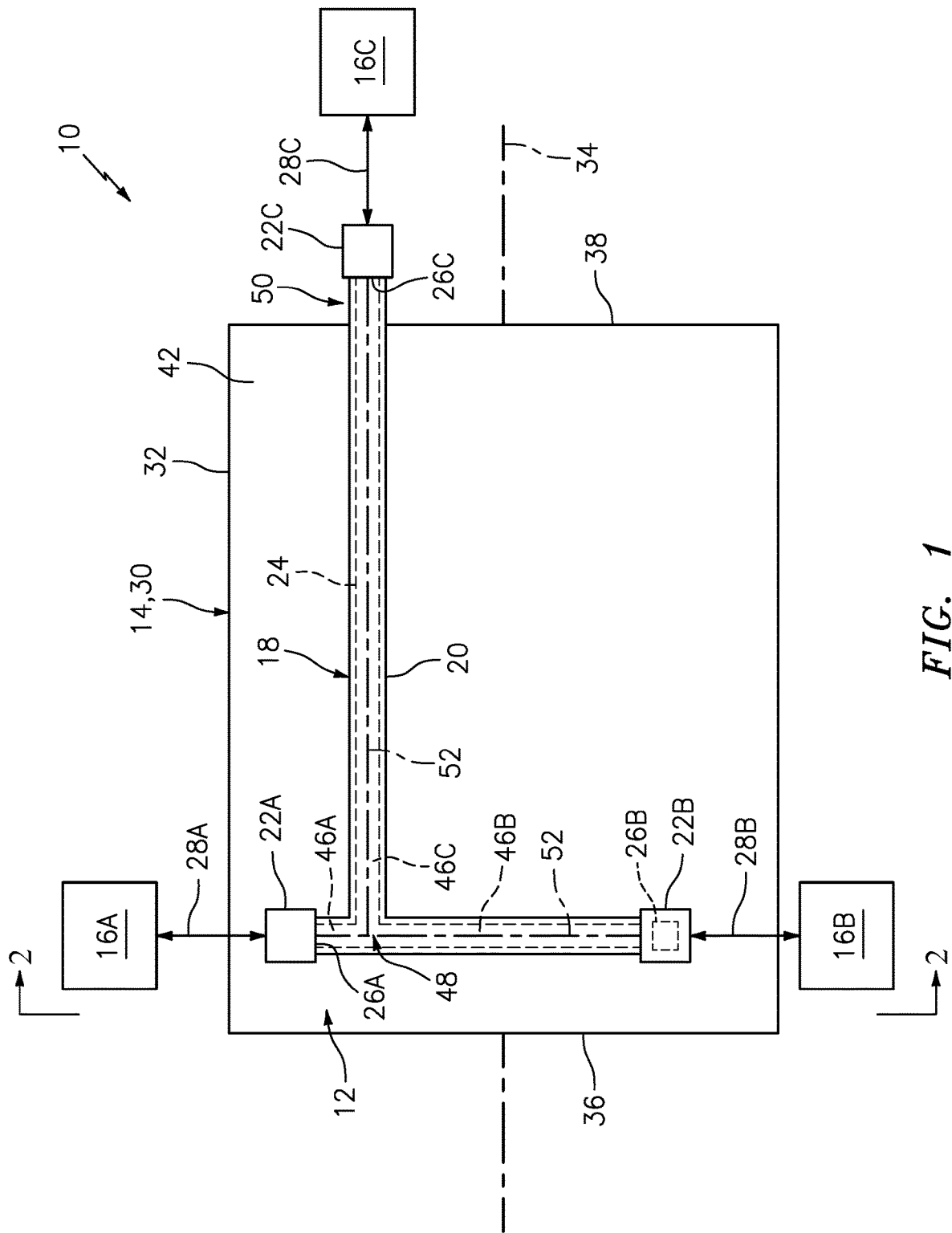
FIG. 1 is a side illustration of an assembly for a gas turbine engine.

FIG. 1 illustrates an assembly 10 for a gas turbine engine. This turbine engine assembly 10 includes an engine system 12 and a turbine engine component 14.

The engine system 12 may be configured as or included in an engine control system and/or an engine sensor system. The engine system 12 of FIG. 1, for example, includes a plurality of system devices 16A C 16A, 16B and 16C (generally referred to as 16) and a communication system 18 for facilitating communication between the system devices 16.

The system devices 16 may include a controller (e.g., an electronic control module (ECM)) and one or more sensors (e.g., probes). Examples of the sensors include, but are not limited to, a speed sensor, a power sensor, a temperature sensor (e.g., an exhaust gas temperature (EGT) sensor), a pressure sensor and a flow sensor. The system devices 16 may also or alternatively include one or more actuators. Examples of the actuators include, but are not limited to, an electronic valve for actuating a hydraulic or pneumatic device, an electronic pump for actuating a hydraulic or pneumatic device, and an electronic switch for actuating an electric motor. The system devices 16 may also or alternatively include one or more electronic ignition devices. Examples of the electronic ignition devices include, but are not limited to, electric spark ignition engine start devices and electronic pyro flare engine start devices. Of course, various other types of sensors, actuators and, more generally, system devices are known in the art for a gas turbine engine application, and the present disclosure is not limited to any particular ones thereof.

The communication system 18 of FIG. 1 includes a waveguide 20 and a plurality of transceivers 22A, 22B and 22C (generally referred to as 22) (e.g., input/output devices). The waveguide 20 is configured with at least one waveguide channel 24 (e.g., an internal waveguide passage) within the waveguide 20. This waveguide channel 24 is configured to provide a signal path for electric, magnetic and/or electromagnetic signal waves (e.g., radio frequency (RF) waves) between two or more waveguide portals 26A, 26B and 26C (generally referred to as 26) of the waveguide 20. The term waveguide portal may describe a signal input and/or output port for coupling at least one transceiver to a waveguide channel. One or more waveguide portal 26, for example, may each be configured as an aperture (e.g., a through hole) that extends through a wall of the waveguide 20 and that is fluidly coupled with the waveguide channel 24.

The transceivers 22 are respectively configured to be in signal communication with (e.g., hardwired and/or wirelessly coupled to) at least one of the system devices 16. The transceiver 22A, 22B, 22C of FIG. 1, for example, is configured in signal communication with a respective one of the system devices 16A, 16B, 16C through an electrical conduit 28A, 28B and 28C (generally referred to as 28); e.g., a bundle of one or more wires. Each transceiver 22 is also arranged and/or mated with a respective one of the waveguide portals 26. Each transceiver 22 may thereby: (A) receive a signal from the respective system device 16; and (B) convert the received signal into signal wave(s) for transmission within the waveguide channel 24 to one or more of the other transceivers 22. Each transceiver 22 may also or alternatively thereby: (A) receive signal wave(s) transmitted through the waveguide channel 24 from one or more of the other transceivers 22; and (B) convert the received signal wave(s) into a signal for transmission to the respective system device 16 through, for example, the electrical conduit 28.

Figure 2:
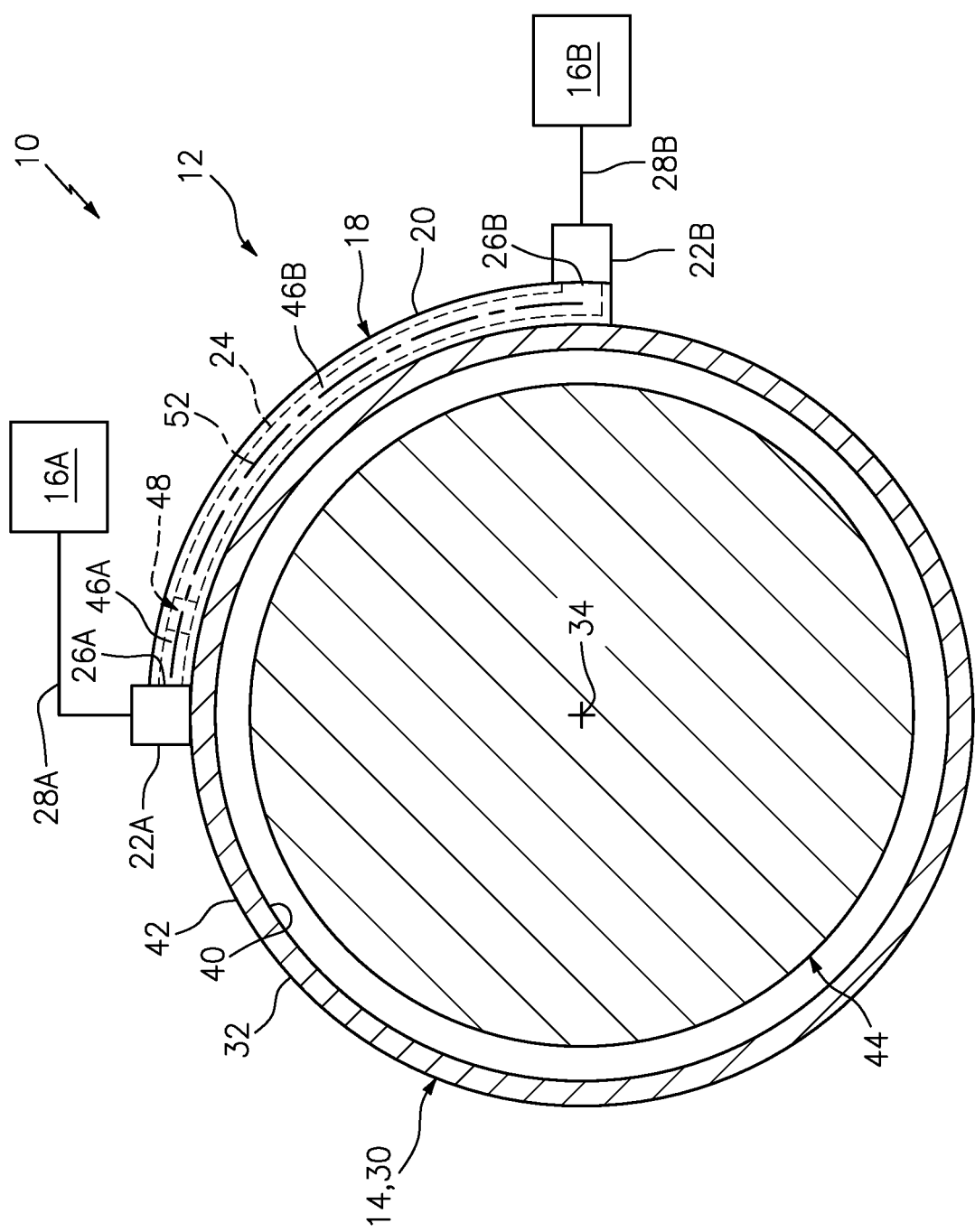
FIG. 2 is a cross-sectional illustration of the turbine engine assembly taken along line 2-2 in FIG. 1.

The turbine engine component 14 of FIG. 1 is configured as a turbine engine case 30. This turbine engine case 30 includes a case wall 32 that extends axially along an axial centerline 34 between and to a first end 36 and a second end 38. Referring to FIG. 2, the case wall 32 extends circumferentially about (e.g., completely around) the axial centerline 34. The case wall 32 and, thus, the turbine engine case 30 of FIG. 2, for example, are each configured as a full hoop, tubular body. The case wall 32 also extends radially between and to a radial inner side 40 and a radial outer side 42.

The turbine engine case 30 and the case wall 32 of FIG. 2 are configured to at least partially (or completely) house one or more sections 44 of the turbine engine; e.g., a fan section, a compressor section, a combustor section, a turbine section and/or an exhaust section of the turbine engine. The turbine engine case 30, for example, may extend circumferentially around (e.g., circumscribe) and axially overlap at least a portion or an entirety of the one or more turbine engine sections 44. The turbine engine case 30, for example, may be configured as a fan case, a compressor case, a combustor case, a turbine case and/or an exhaust case.

Figure 3:
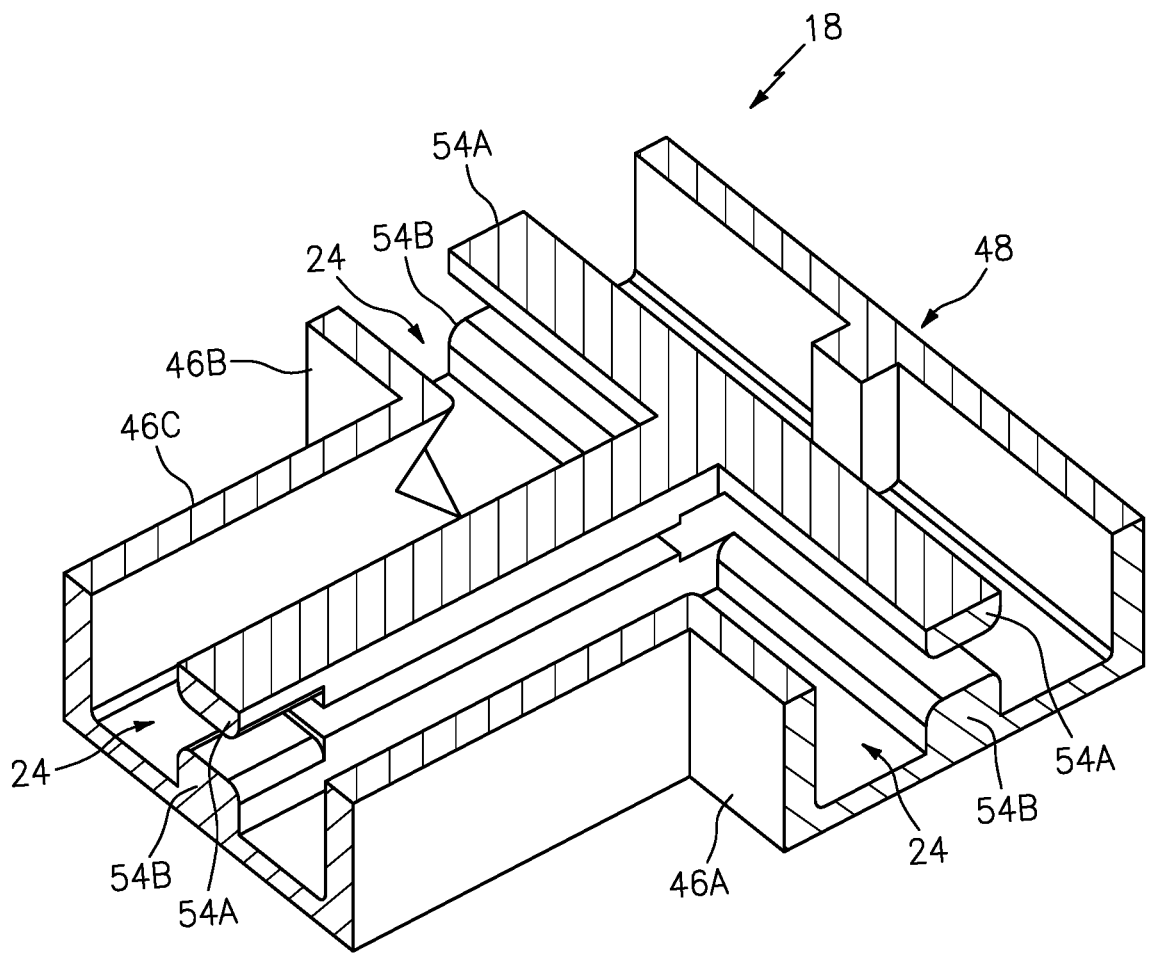
FIG. 3 is a cutaway illustration of a T-junction between waveguides.

Referring to FIGS. 1 and 2, the waveguide 20 and its waveguide channel 24 are integrated with the turbine engine case 30; see also FIG. 3. The waveguide channel 24, for example, may be embedded within the turbine engine case 30. More particularly, the waveguide 20 may be formed integral with the case wall 32. The turbine engine case 30, for example, may include both the case wall 32 and the waveguide 20, where the case wall 32 and the waveguide 20 and, more generally, the entire turbine engine case 30 may be configured as a single monolithic body. Herein, the term monolithic may describe an apparatus which is formed as a single unitary body. The waveguide 20, for example, may be cast, machined, additively manufactured and/or otherwise formed integral with the case wall 32 as a unitary body; see also FIG. 3. Thus, the waveguide 20 is a permanent element of the turbine engine case 30. By contrast, a non-monolithic body may include a waveguide that is discretely formed from a case wall, where the waveguide is subsequently mechanically fastened and/or otherwise removably attached to the case wall.

By integrating the waveguide 20 and its waveguide channel 24 into the turbine engine case 30, complexity and weight of the turbine engine assembly 10 may be reduced. The integration may free up peripheral space about the turbine engine case 30 for packaging other turbine engine components and/or for reducing an overall size of the turbine engine. Utilizing a waveguide versus a wiring harness may also reduce overall complexity of the communication system 18 as well as obviate the need for at least some wire connectors. This in turn may provide mistake proofing during turbine engine manufacture and/or repair, reduce cost of the communication system 18 and/or increase reliability of the turbine engine.

Referring still to FIGS. 1 and 2, the waveguide 20 is located at (e.g., on, adjacent or proximate) the case wall outer side 42. The waveguide 20 may be arranged adjacent and/or may extend (e.g., axially and/or circumferentially) along the case wall 32.

The waveguide channel 24 of FIG. 1 includes one or more channel segments 46A-C (generally referred to as 46) interconnected at a junction 48; e.g., a T-junction such as a magic tee junction (also known as a magic T junction). The first channel segment 46A leads (e.g., extends, projects out) from the junction 48 towards the first transceiver 22A; e.g., to the first waveguide portal 26A. The second channel segment 46B leads from the junction 48 towards the second transceiver 22B; e.g., to the second waveguide portal 26B. The third channel segment 46C leads from the junction 48 towards the third transceiver 22C; e.g., to the third waveguide portal 26C. With this arrangement, the third channel segment 46C may form a base of the junction 48 and the first and the second channel segments 46A and 46B may form arms of a top of the junction 48. An exemplary embodiment of the junction 48 configured as a magic tee junction is illustrated in FIG. 3. The present disclosure, however, is not limited to such exemplary waveguide channel segment and/or inter-segment junction configurations. For example, in other embodiments, some or each of the channel segments 46 may be interconnected with one another at an L-junction, an E-junction, a V-junction, a K-junction, an X-junction, etc.

In some embodiments, referring to FIG. 1, at least a portion 50 of the waveguide 20 may be cantilevered from the case wall 32. The waveguide portion 50 of FIG. 1, for example, may project axially out from the second end 38 of the case wall 32 to, for example, the third waveguide portal 26C at a distal end of the waveguide 20.

Figure 4:
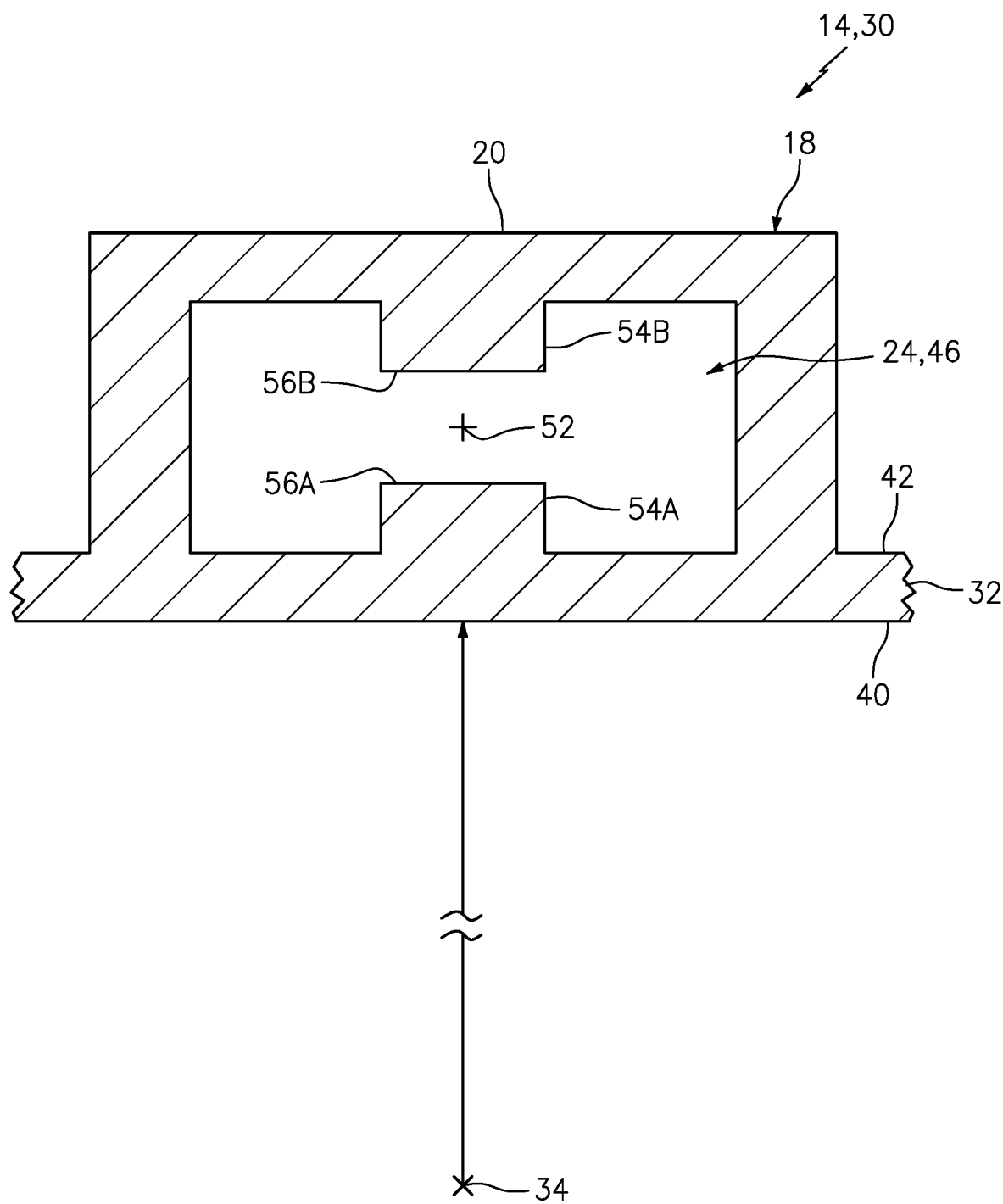
FIG. 4 is a sectional illustration of a portion of a turbine engine component integrated with a waveguide.

In some embodiments, referring to FIG. 4, at least a portion or an entirety of the waveguide channel 24 may be configured with a lobed cross-sectional geometry when viewed, for example, in a plane perpendicular to a longitudinal centerline 52 of the waveguide channel 24; e.g., plane of FIG. 4. The waveguide channel 24 of FIG. 4, for example, is configured with an H-shaped (or I-shaped) cross-sectional geometry. More particularly, the waveguide 20 of FIG. 4 includes one or more lobes 54A and 54B (generally referred to as 54) (e.g., ribs, projections, etc.). Each of these lobes 54 may be configured to guide the electric, magnetic and/or electromagnetic signal waves through the waveguide channel 24 between the different transceivers 22; e.g., between the transceivers 22A and 22B, between the transceivers 22A and 22C, and/or between the transceivers 22B and 22C. The first lobe 54A (e.g., rib) of FIG. 4, for example, is arranged at a first (e.g., radial inner) side of the waveguide channel 24. This first lobe 54A projects vertically (e.g., in a radial direction) partially into the waveguide channel 24 to a distal edge 56A. The first lobe 54A extends longitudinally within the waveguide channel 24 along the longitudinal centerline 52; e.g., along an entirety (or more than 75%) of a longitudinal length of the waveguide channel 24. The second lobe 54B (e.g., rib) is arranged at a second (e.g., radial outer) side of the waveguide channel 24. This second lobe 54B projects vertically (e.g., in a radial direction) partially into the waveguide channel 24 to a distal edge 56B. The second lobe 54B extends longitudinally within the waveguide channel 24 along the longitudinal centerline 52; e.g., along the entirety (or more than 75%) of the longitudinal length of the waveguide channel 24. The second lobe 54B may be arranged opposite (e.g., diametrically opposed to) and/or aligned with the first lobe 54A. The second lobe 54B may also or alternatively have the same cross-sectional geometry as the first lobe 54A at, for example, common locations along the longitudinal centerline 52. At least a portion (or an entirety) of one or more corners of each lobe 54A, 54B may be eased (e.g., rounded, bullnosed, chamfered, etc.; see FIG. 3). At least a portion (or an entirety) of one or more corners of each lobe 54A, 54B may also or alternatively be sharp (e.g., pointed, squared-off, etc.; see FIGS. 3 and 4). The present disclosure, however, is not limited to such exemplary waveguide channel cross-sectional geometries nor longitudinal lobe lengths. For example, in other embodiments, the waveguide 20 may include a single lobe (e.g., rib), more than two lobes (e.g., ribs) or the waveguide 20 may be configured without any lobes.

Figure 5:
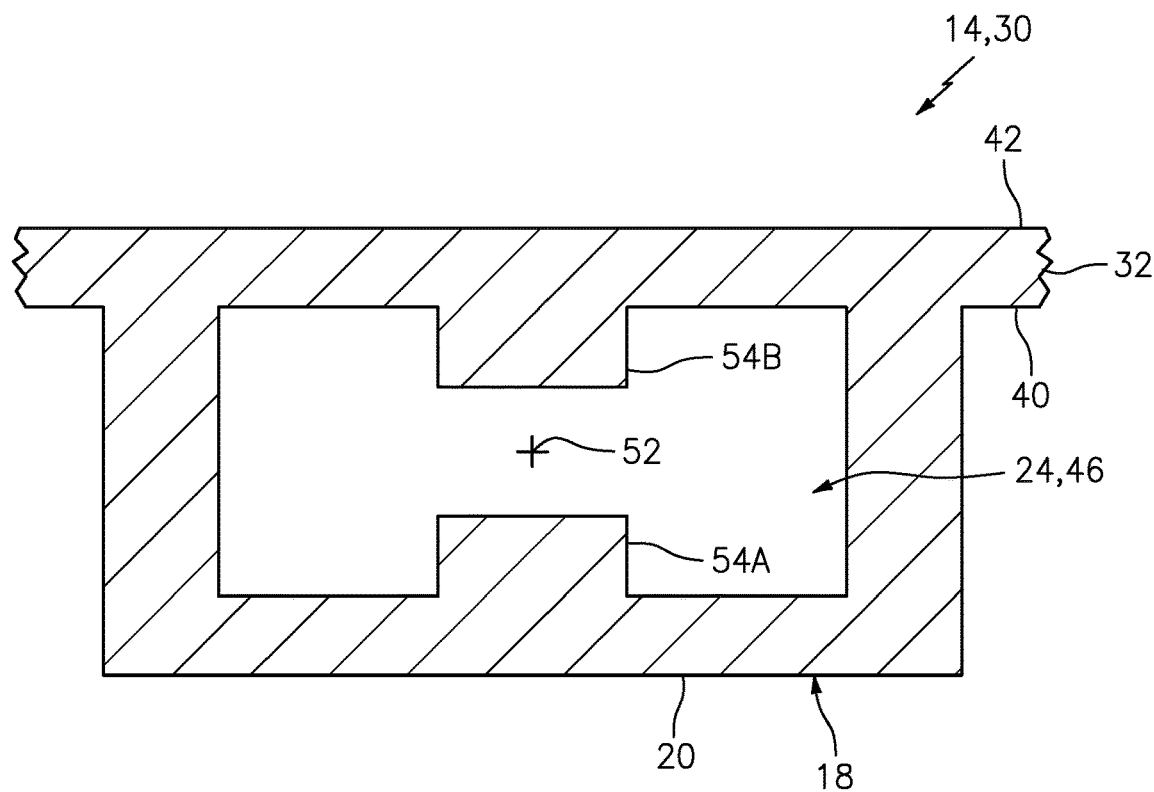
FIG. 5 is a sectional illustration of a portion of another turbine engine component integrated with a waveguide.
Figure 6:
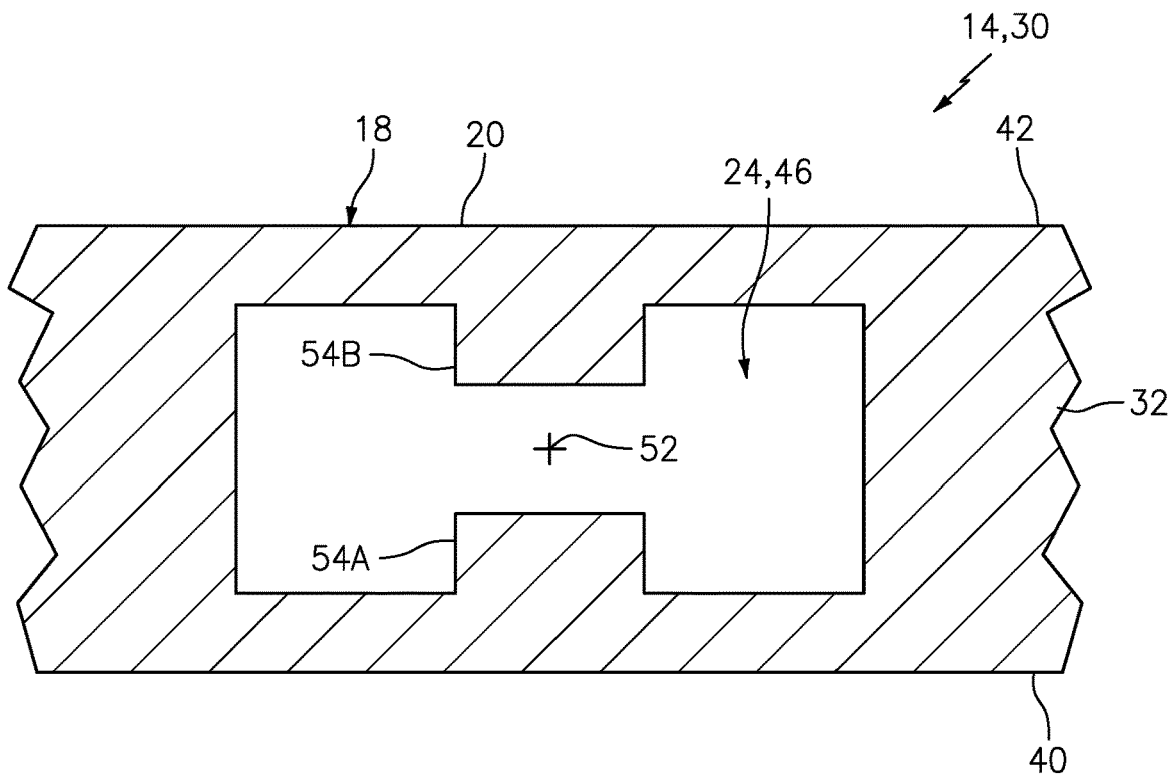
FIG. 6 is a sectional illustration of a portion of still another turbine engine component integrated with a waveguide.

The waveguide 20 is described above as being located at the case wall outer side 42. However, in other embodiments, at least a portion or an entirety of the waveguide 20 may alternatively be located at the case wall inner side 40 as shown, for example, in FIG. 5. In still other embodiments, at least a portion or an entirety of the waveguide channel 24 may alternatively be recessed into or embedded within a thickness of the case wall 32 as shown, for example, in FIG. 6.

The waveguide 20 is described above as being formed integral with the case wall 32. However, in other embodiments, the waveguide 20 may be formed as a discrete body from the case wall 32 and subsequently permanently attached (e.g., welded or otherwise permanently bonded) to the case wall 32.

The turbine engine component 14 is described above as the turbine engine case 30. The present disclosure, however, is not limited to such an exemplary turbine engine component configuration. Rather, the turbine engine component 14 may alternatively be configured as or also include another component of the turbine engine where that component includes a wall (e.g., a sidewall) with which the waveguide 20 may be integrated as described herein.

Figure 7:
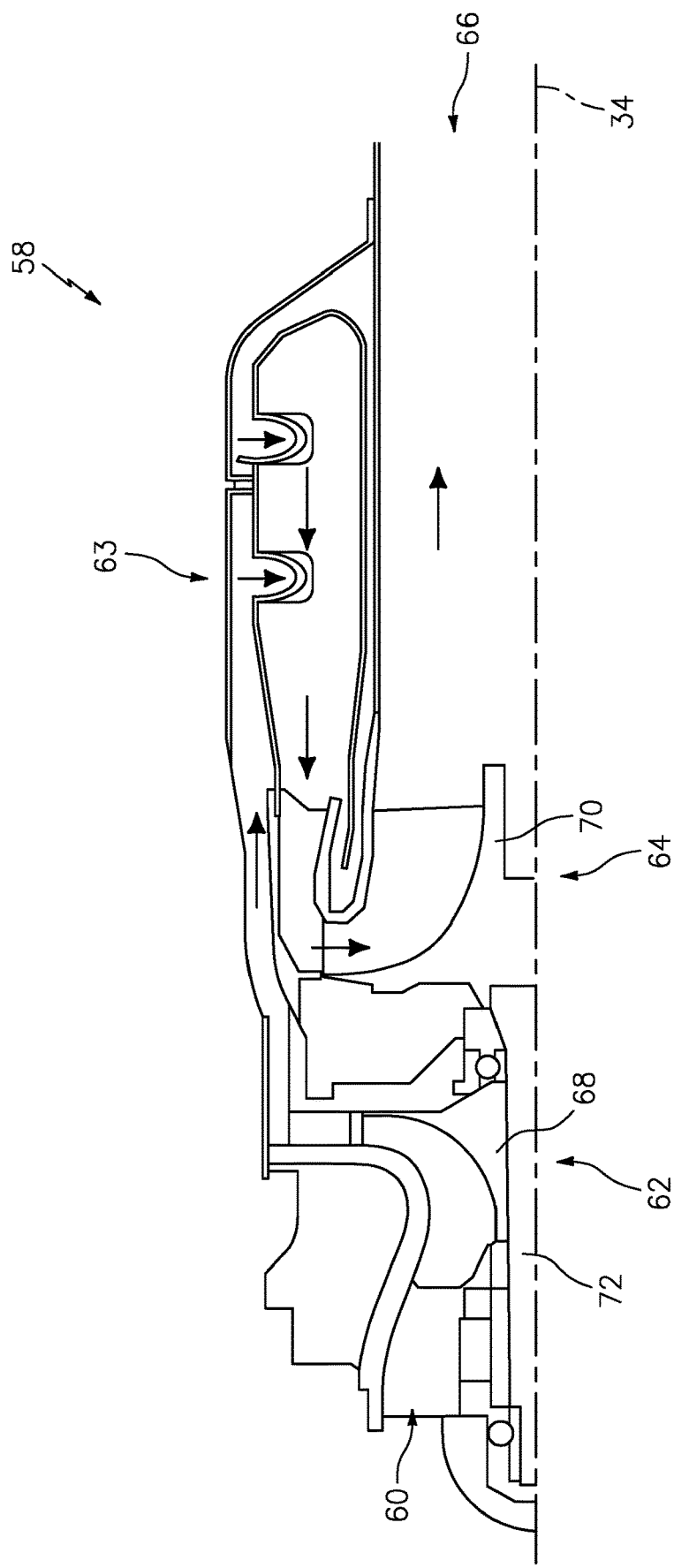
FIG. 7 is a side schematic illustration of a gas turbine engine.

The turbine engine assembly 10 of the present disclosure may be configured with different types and configurations of turbine engines. FIG. 7 illustrates one such type and configuration of the turbine engine—a one-spool, radial-flow turbojet turbine engine 58 configured for propelling an unmanned aerial vehicle (UAV), a drone or any other aircraft or self-propelled projectile. In the specific embodiment of FIG. 7, the turbine engine 58 includes an upstream inlet 60, a (e.g., radial) compressor section 62, the combustor section 63, a (e.g., radial) turbine section 64 and a downstream exhaust 66 fluidly coupled in series. A compressor rotor 68 in the compressor section 62 is coupled with a turbine rotor 70 in the turbine section 64 by a shaft 72, which rotates about a centerline/rotational axis of the turbine engine 58; e.g., the axial centerline 34. In such an embodiment, the turbine engine case 30 (see FIG. 1) may be configured to at least partially or completely house any one or more of the turbine engine sections 62, 63 and 64.

Figure 8:
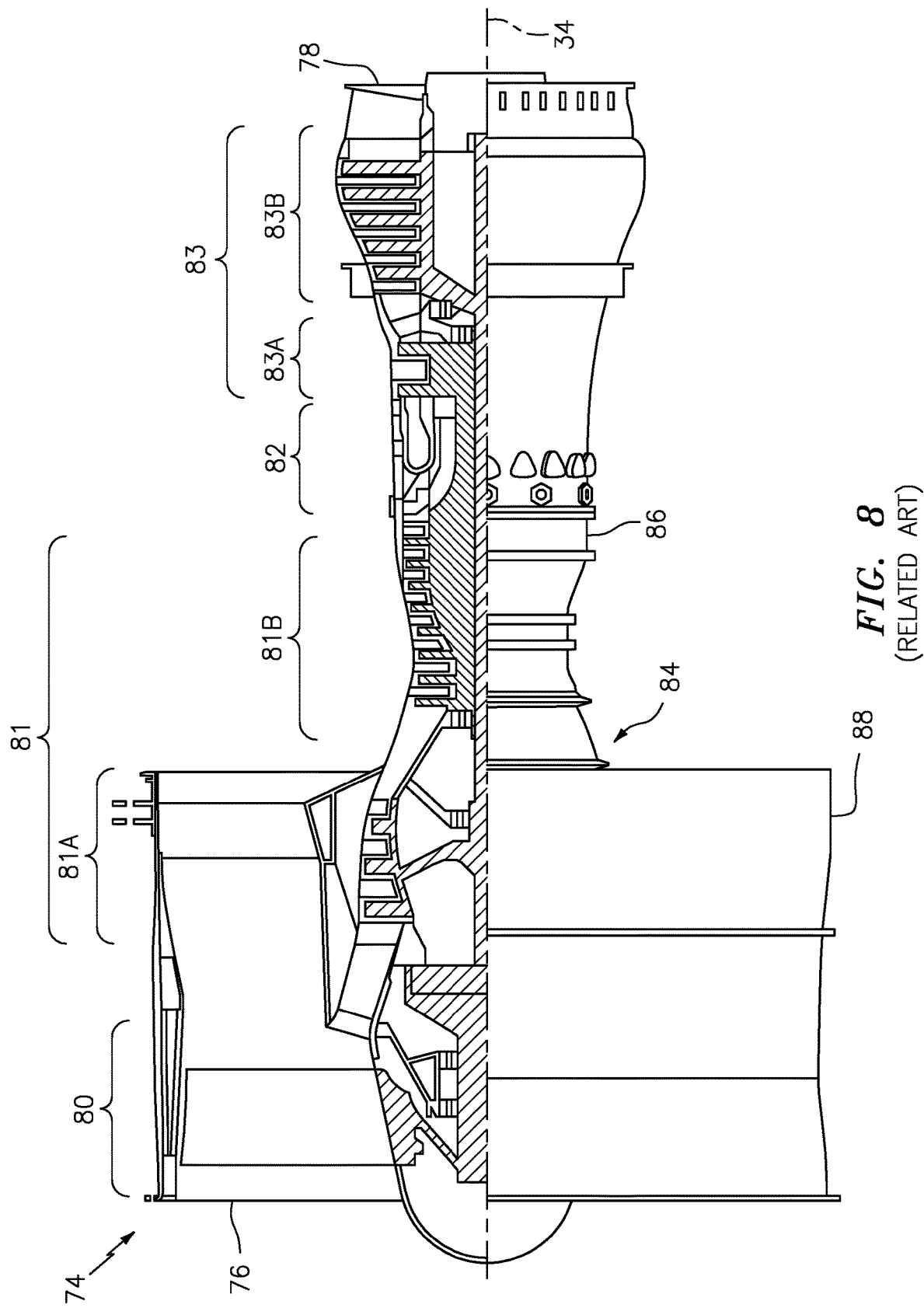
FIG. 8 is a side cutaway illustration of another gas turbine engine.

FIG. 8 illustrates another type and configuration of the turbine engine a turbofan turbine engine 74 configured for propelling an aircraft such as, but not limited to, a passenger plane or a cargo plane. In the specific embodiment of FIG. 8, the turbine engine 74 extends along a centerline/rotational axis of the turbine engine 74 (e.g., the axial centerline 34) between an upstream inlet 76 and a downstream exhaust 78. The turbine engine 74 includes a fan section 80, a compressor section 81, a combustor section 82 and a turbine section 83. The compressor section 81 includes a low pressure compressor (LPC) section 81A and a high pressure compressor (HPC) section 81B. The turbine section 83 includes a high pressure turbine (HPT) section 83A and a low pressure turbine (LPT) section 83B. These engine sections 80, 81A, 81B, 82, 83A and 83B are arranged sequentially along the axial centerline 34 within an engine housing 84. This engine housing 84 includes an inner case 86 (e.g., a core case) and an outer case 88 (e.g., a fan case), where the turbine engine case 30 (see FIG. 1) may be configured as or included in the inner case 86 or the outer case 88. The inner case 86 may house one or more of the engine sections 81A, 81B, 82, 83A and 83B; e.g., an engine core. The outer case 88 may house at least the fan section 80.

The turbine engine assembly 10 may be included in various turbine engines other than the one described above. The turbine engine assembly 10, for example, may be included in a geared turbine engine where a gear train connects one or more shafts to one or more rotors in a fan section, a compressor section and/or any other engine section. Alternatively, the turbine engine assembly 10 may be included in a turbine engine configured without a gear train. The turbine engine assembly 10 may be included in a geared or non-geared turbine engine configured with a single spool (e.g., see FIG. 7), with two spools (e.g., see FIG. 8), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
a turbine engine case including a case wall and a waveguide configured with the case wall as a monolithic body, the waveguide comprising a waveguide channel;
a first transceiver; and
a second transceiver configured to be in signal communication with the first transceiver through the waveguide channel.

2. The assembly of claim 1, wherein the first transceiver is attached to the turbine engine case at a first portal of the waveguide channel.

3. The assembly of claim 2, wherein the second transceiver is attached to the turbine engine case at a second portal of the waveguide channel.

4. The assembly of claim 1, further comprising a third transceiver configured to be in signal communication with at least the first transceiver through the waveguide channel.

5. The assembly of claim 4, wherein
the waveguide channel comprises a plurality of channel segments interconnected at a junction;
the plurality of channel segments include a first channel segment, a second channel segment, and a third channel segment;
the first channel segment extends from the junction towards the first transceiver;
the second channel segment extends from the junction towards the second transceiver; and
the third channel segment extends from the junction towards the third transceiver.

6. The assembly of claim 5, wherein the junction is configured as a T-junction.

7. The assembly of claim 1, wherein the waveguide includes a first projection that projects into the waveguide channel.

8. The assembly of claim 7, wherein
the waveguide further includes a second projection that projects into the waveguide channel; and
the first projection and the second projection are arranged on opposing sides of the waveguide channel.

9. The assembly of claim 1, wherein at least a portion of the waveguide channel has a lobed cross-sectional geometry.

10. The assembly of claim 1, wherein at least a portion of the waveguide channel has an H-shaped cross-sectional geometry.

11. The assembly of claim 1, further comprising a controller in signal communication with the waveguide channel through the first transceiver.

12. The assembly of claim 11, further comprising a sensor in signal communication with the waveguide channel through the second transceiver.

13. The assembly of claim 1, further comprising a combustor section at least partially housed within the turbine engine case.

14. The assembly of claim 1, further comprising a turbine section at least partially housed within the turbine engine case.

15. The assembly of claim 1, wherein the first transceiver is configured to transmit a first radio frequency signal into and to receive a second radio frequency signal from the waveguide.

16. An assembly for a turbine engine, comprising:
a turbine engine component including a wall and a waveguide, the waveguide adjacent and extending along the wall, and at least the wall and the waveguide configured together as a monolithic body;
a first transceiver; and
a second transceiver configured to be in signal communication with the first transceiver through the waveguide.

17. The assembly of claim 16, wherein
the turbine engine component comprises a turbine engine case; and
the wall comprises a case wall of the turbine engine case.

18. An assembly for a turbine engine, comprising:
a turbine engine component;
a waveguide adjacent and extending along the turbine engine component, the waveguide configured with the turbine engine component in a monolithic body;
a first transceiver at a first portal into the waveguide; and
a second transceiver at a second portal into the waveguide.

19. The assembly of claim 18, wherein the turbine engine component comprises a turbine engine case.

20. The assembly of claim 18, wherein the first transceiver is configured to transmit electromagnetic signal waves through the waveguide to the second transceiver.

* * * * *